United States Patent [19]

Templeton et al.

[11] Patent Number: 5,409,080
[45] Date of Patent: Apr. 25, 1995

[54] SHIFTABLE CONTROL CONSOLE FOR TRACTORS

[75] Inventors: David J. Templeton, New Holland, Pa.; Russell W. Strong, Craftsbury Common, Vt.; Richard E. Jennings, Lisbon, Iowa

[73] Assignee: Ford New Holland, Inc., New Holland, Pa.

[21] Appl. No.: 169,849

[22] Filed: Dec. 17, 1993

[51] Int. Cl.$^6$ ............................................. B60K 26/00
[52] U.S. Cl. .................................... 180/326; 180/334
[58] Field of Search ................ 180/326, 330, 331, 334; 74/471, 484 R

[56]  References Cited

U.S. PATENT DOCUMENTS

| | | | |
|---|---|---|---|
| 4,026,379 | 5/1977 | Dunn et al. | 180/331 |
| 4,478,308 | 10/1984 | Klaassen | 180/326 |
| 4,505,356 | 3/1985 | Baier et al. | 180/326 |
| 4,869,337 | 9/1989 | Wagner | 180/330 |

FOREIGN PATENT DOCUMENTS

| | | | |
|---|---|---|---|
| 2562847 | 10/1985 | France | 180/334 |
| 0944350 | 6/1956 | Germany | 180/326 |

Primary Examiner—Margaret A. Focarino
Assistant Examiner—Christopher R. Ellis
Attorney, Agent, or Firm—Larry W. Miller; Frank A. Seemar

[57]   ABSTRACT

A shiftable control console for an agricultural tractor is disclosed wherein the console is movable independently of the operator's seat to position the operative controls at the convenience of the operator. The console is mounted on pivoted linkages that are oriented to rotate the console clockwise as it is moved rearwardly to mimic the rotation of the operator's seat to an implement operating position. Fore-and-aft movement of the console is effected by an electric actuator controlled through a switch mounted on the console.

12 Claims, 6 Drawing Sheets

SHIFTABLE CONTROL CONSOLE FOR TRACTORS

BACKGROUND OF THE INVENTION

This invention relates generally to off-road motor vehicles, such as tractors, and more particularly, to a console, housing operative controls for the vehicle, that is shiftable to position the operative controls to a convenient position selectable by the operator.

Tractors, particularly tractors used in an agricultural environment, are provided with an operator's seat that is shiftable in a fore-and-aft direction to place the operator at a comfortable location relative to the steering wheel. Agricultural tractors are often provided with an operator's seat that is also rotatable approximately 15° clockwise to facilitate the need for the operator to look over his or her right shoulder to view the operation of an implement being towed by the tractor behind the operator.

Typically, many of the controls for the operation of the tractor and most of the power-takeoff and hydraulic controls for controlling the operation of the implement operatively connected to the tractor and usually positioned rearwardly of the tractor, are located in a fixed console adjacent the right side of the operator's seat for convenient manipulation thereof by the operator, particularly while the operator is operating the towed implement as well. The positioning of the operator's seat in the fore-and-aft direction, and particularly the positioning of the operator's seat to the clockwise rotated position, causes a positional variance between the fixed console and the movable seat. The result to the operator is that controls that are conveniently accessible in one position of the operator's seat are no longer in the desired positional relationship to the operator when the seat position is moved to an alternative position.

Accordingly, it would be desirable to provide a tractor console that would be selectively movable to position the operative controls housed thereon in a conveniently accessible position as desired by the operator.

SUMMARY OF THE INVENTION

It is an object of this invention to overcome the aforementioned disadvantages of the prior art by providing a control console for an off-road vehicle that is positionally movable relative to the adjacent operator's seat to position the operative controls housed thereon at the convenience of the operator.

It is another object of this invention to provide a movable control console that is movable independently of the movement of the operator's seat.

It is yet another object of this invention to provide a movable control console for an agricultural tractor that can be shifted to locate the operative controls to correspond to the rotation of the operator's seat to a implement operating position.

It is a feature of this invention that the shiftable control console is infinitely positionally variable within a preselected range of motion relative to the operator's seat.

It is an advantage of this invention that the operator can manually position the operative controls to locate these controls at the convenience of the operator irrespective of the relative position of the operator's seat.

It is another feature of this invention that the control console is mounted on a pair of pivoted linkages oriented to allow the console to move along a preselected path to rotate the console as it is shifted.

It is another advantage of this invention that the shiftable control console rotates outwardly approximately 15° as it is shifted rearwardly to mimic the clockwise rotation of the operator's seat rotated to the implement operating position.

It is still another advantage of this invention that the operative controls can be located at the convenience of the operator.

It is another feature of this invention that the movements of the shiftable console are electrically actuated through manipulation of a switch located on the console.

It is a further object of this invention to provide a shiftable control console for an agricultural tractor which is durable in construction, inexpensive manufacture, carefree of maintenance, facile in assemblage, and simple and effective in use.

These and other objects, features, and advantages are accomplished according to the instant invention by providing a shiftable control console for an agricultural tractor that is movable independently of the operator's seat to position the operative controls at the convenience of the operator. The console is mounted on pivoted linkages that are oriented to rotate the console clockwise as it is moved rearwardly to mimic the rotation of the operator's seat to an implement operating position. Fore-and-aft movement of the console is effected by an electric actuator controlled through a switch mounted on the console.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
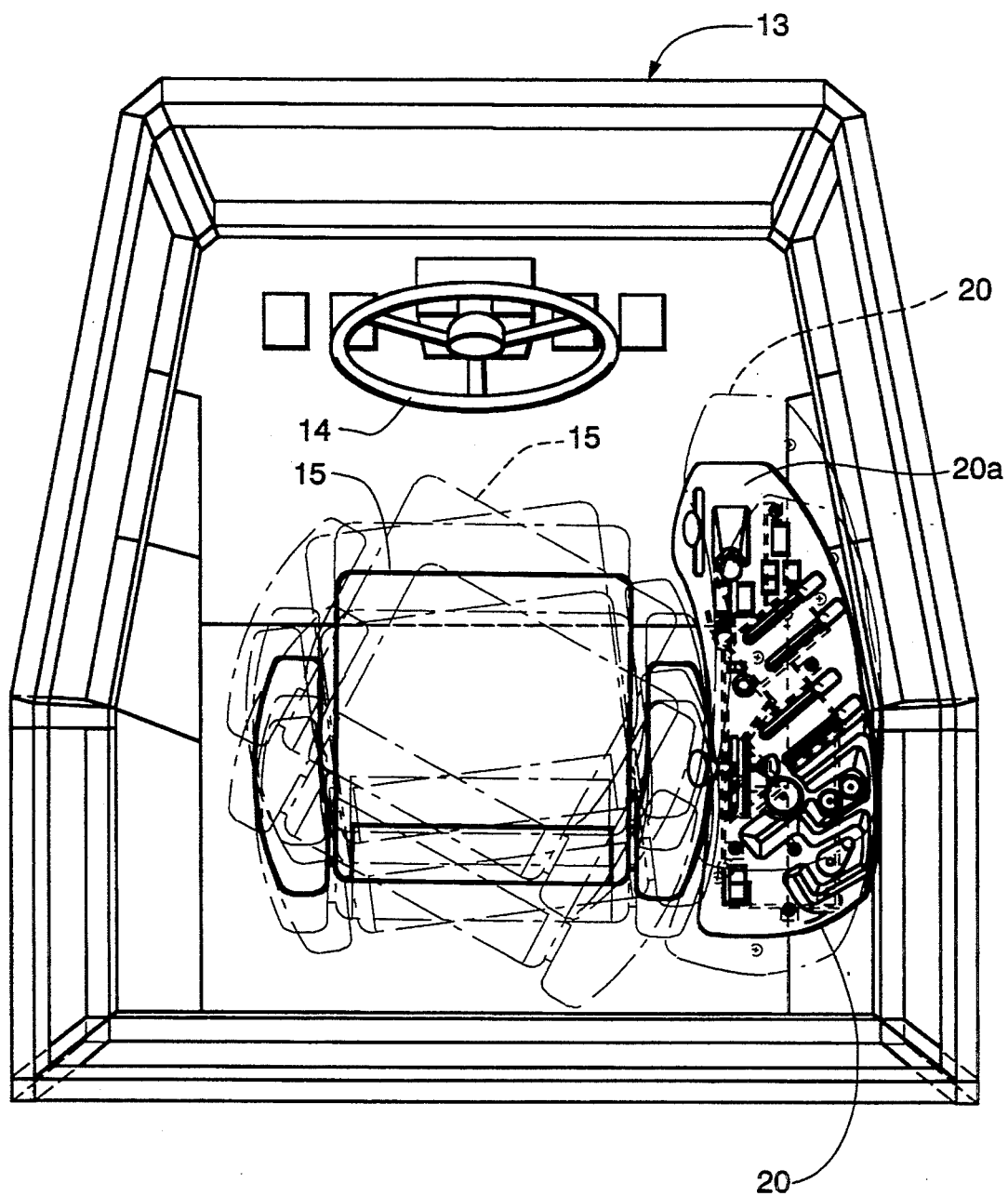
FIG. 1 is a top plan view of the interior of the operator's cab of the tractor shown in FIG. 6, the range of the fore-and-aft and rotational positional movements of the operator's seat being shown in phantom, the range of independent movement of the shiftable control console also being shown in phantom.
Figure 2:
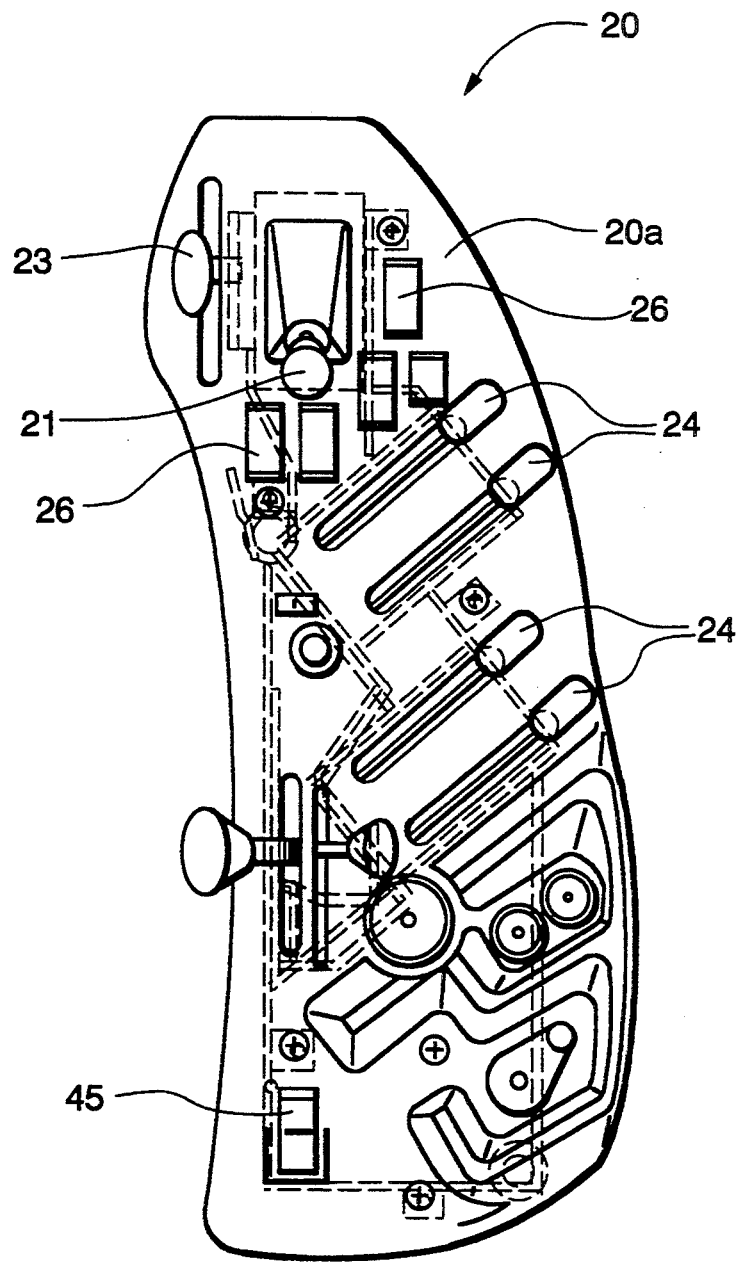
FIG. 2 is an enlarged top plan view of the control console.
Figure 6:
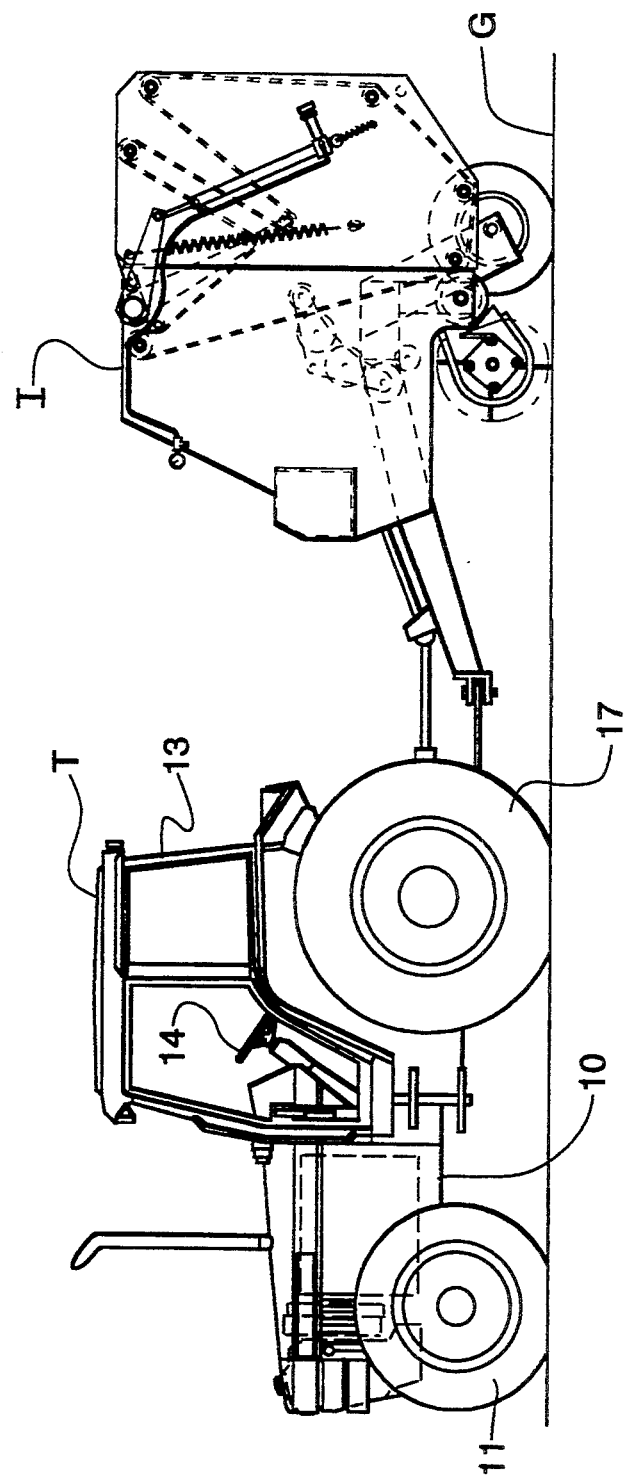
FIG. 6 is a side elevational view of a tractor incorporating the principles of the instant invention, the tractor having a representative implement connected thereto to be operable rearwardly thereof.

Referring now to the drawings and, particularly, to FIGS. 1 and 6, a representative view of an agricultural tractor incorporating the principles of the instant invention can best be seen. Left and right references are used as a matter of convenience and are determined by standing at the rear of the tractor and facing the forward end in the normal direction of travel. The tractor chassis 10 houses a conventional engine 12 serving to provide operational power for the tractor T and the attached implement I, and an operator's cab 13 positioned in an elevated location. The operator's cab 13 includes a steering control 14, positioned forwardly of the operator's seat 15 for conventionally operating the steering of the front wheels 11 in a known manner, and a control console 20 located to the right of the operator's seat 15 to locate controls for operating the tractor T and the attached implement I in a conventional manner. The chassis 10 is supported above the ground G in a conventional manner by forward steerable wheels 11 and rearward drive wheels 17 rotatably mounted in a customary transversely spaced orientation.

Referring now to FIGS. 1–5, one skilled in the art will realize that the control console 20 is positionally movable relative to the operator's seat 15. The control console 20 is provided with a plurality of conventional control levers, switches, etc. which are operable through electronic devices or flexible cables to control various functions of the tractor T or the attached implement I. In the way of an example, the transmission shift lever 21 is associated with electronic switches that are electrical coupled to a transmission controller, such as described in U.S. Pat. No. 5,036,718, issued to Garth H. Bulgrien on Aug. 6, 1991. Consequently, the operator can shift gears in the transmission by appropriate manipulation of the transmission control lever 21, without the requirement of fixed linkage to effect a shifting of the transmission gears in a mechanical manner.

As further examples, the throttle control 23 controlling the speed of the engine 12 is pivoted on the subframe 25 of the console 20 and is connected to the engine by way of a conventional flexible cable (not shown). Likewise, the hydraulic control levers 24 are connected by conventional flexible cables (not shown) to corresponding hydraulic spools (not shown) for controlling the associated hydraulic function of the tractor hydraulic system, to which the implement I is normally operatively connected to power various hydraulic functions. Other controls in the form of switches 26 are connected via wires to the tractor's electrical system to control other operative functions of the tractor, such a solenoids, etc. None of the controls 21, 23, 24 and 26 are straight mechanical controls requiring fixed linkages. As a result, the control console 20 can be somewhat flexible in its orientation relative to the operator's seat 15.

Figure 3:
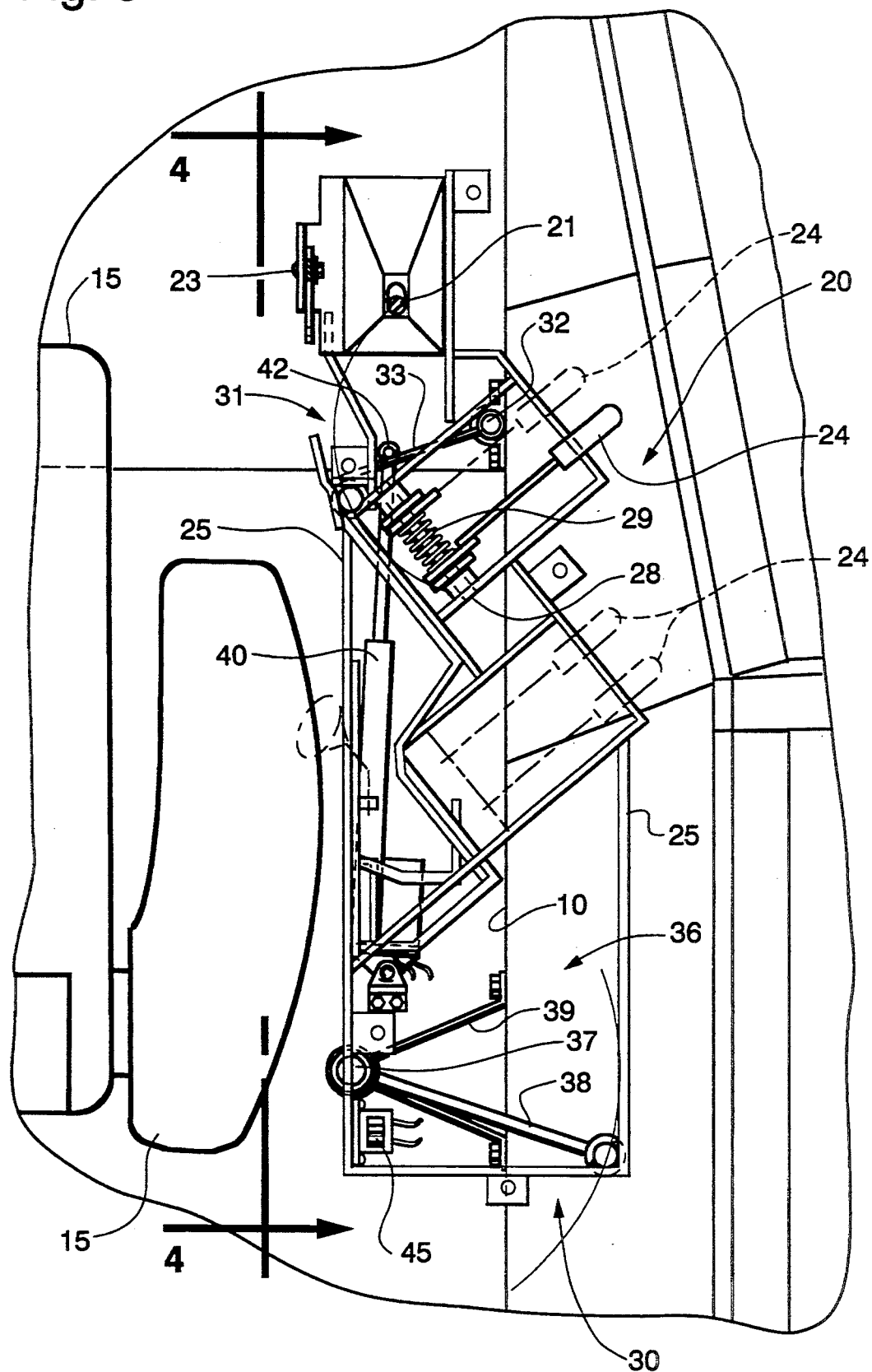
FIG. 3 is a top plan view of the shiftable console with the top panel removed for the purpose of depicting the console subframe and mounting linkages with greater clarity, several representative control levers being shown in phantom and one control lever being exemplarily shown in solid lines.
Figure 4:
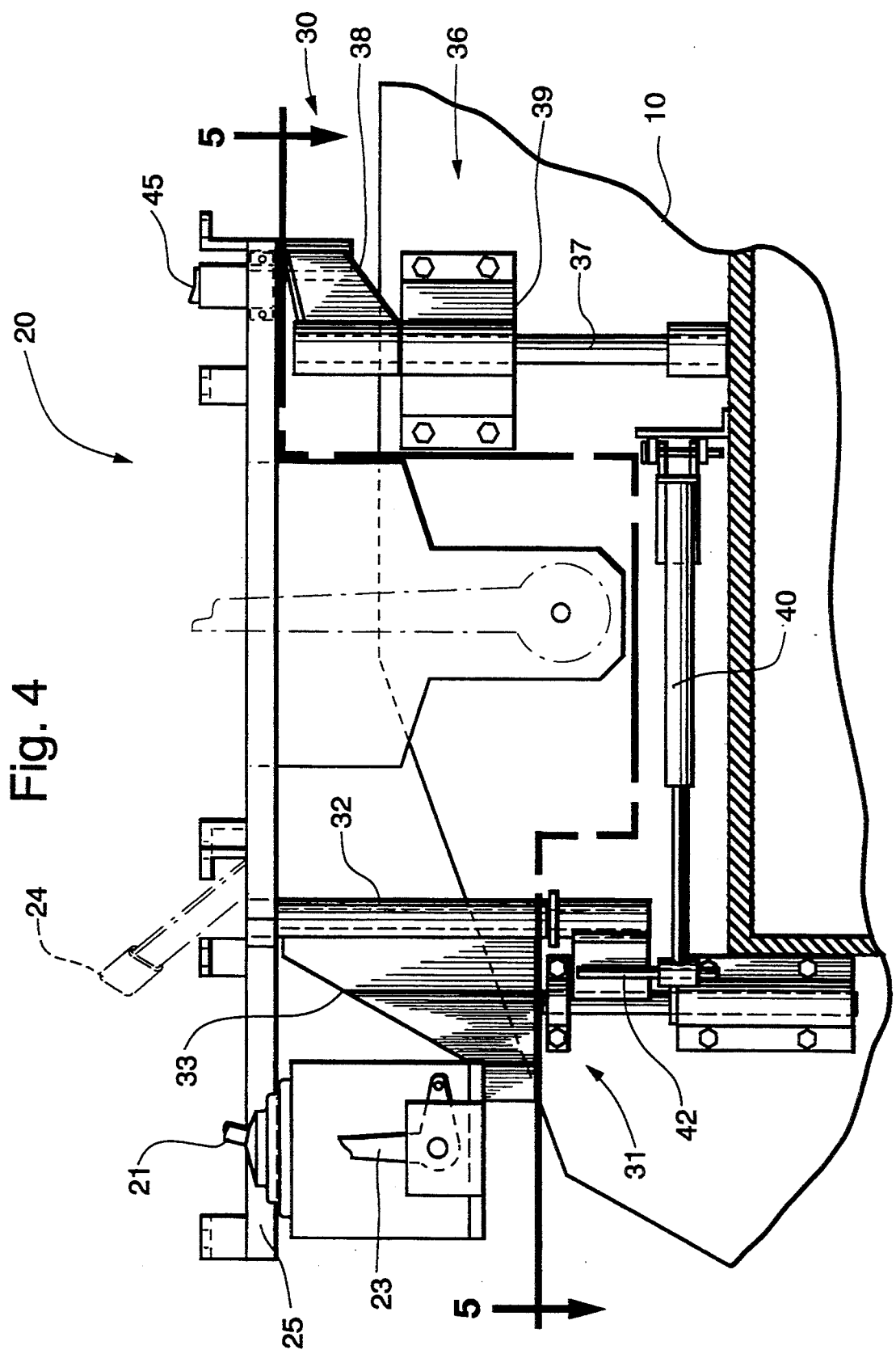
FIG. 4 is a side elevational view of the console subframe and mounting linkage corresponding to lines 4—4 of FIG. 3, a couple of representative control levers being shown in phantom.
Figure 5:
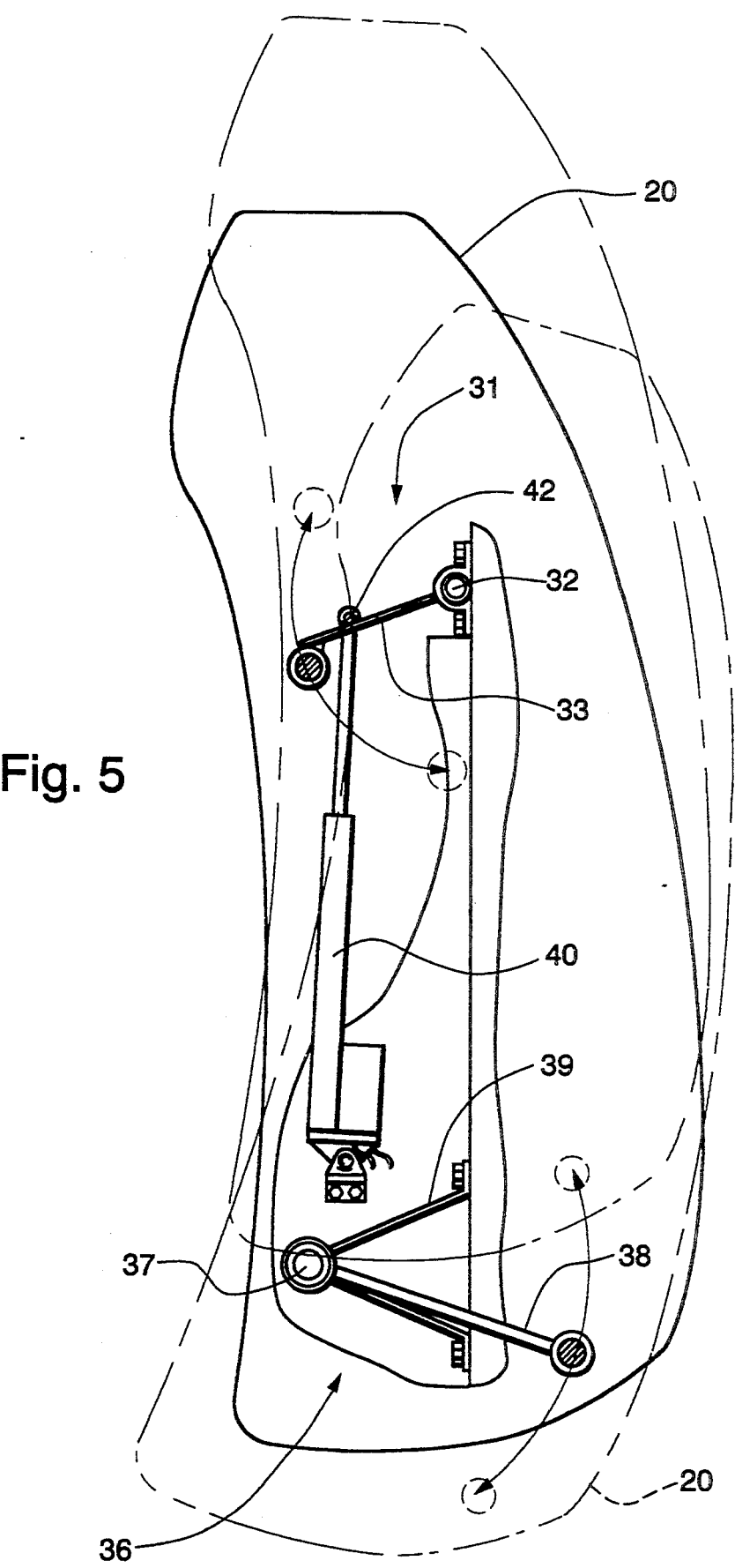
FIG. 5 is a schematic top plan view of the console mounting linkage to depict more clearly the orientation thereof and the range of movement afforded to the shiftable console.

The support of the console subframe 25 to permit movement thereof is best seen in FIGS. 3–5. In the case of pivotal hydraulic control levers 24, the subframe 25 supports a pivot axis 28 about which the lever 24 pivots to effect movement of the flexible cable (not shown) through which the operative control is effected. These pivot axes 28 support a conventional spring-loaded friction restrictor 29 cooperatively associated with the lever 24 to restrict pivotal movement thereof in a known manner. The subframe 25 also provides support for the top panel 20a through which and on which the control mechanisms 21, 23, 24 and 26 are situated.

The subframe 25 is pivotally supported by a mounting linkage 30 to allow movement of the console 20 in a manner described in greater detail below. The mounting linkage 30 includes a forward pivot assembly 31 and a rearward pivot assembly 36 defining generally vertical pivot axes 32, 37, respectively, supported by the chassis 10. Each pivot assembly 31, 36 further includes a swing arm 33, 38, respectively, having a first end connected to and being rotatable about the corresponding pivot axis and a second end connected to the subframe 25 so that the subframe 25 is movable about the pivot axes 32, 37.

The rear pivot assembly 36 also includes a bracket 39 connected to the chassis 10 to locate the rear pivot axis 37 laterally of the front pivot axis 32, such that the rear pivot axis 37 is positioned to the left of a longitudinal line passing through the front pivot axis 32. While the front swing arm 33 extends to the left of the front pivot axis 32, the rear swing arm 38 extends to the right of the rear pivot axis 37, passing over the bracket 39. Beginning at a median location depicted in FIGS. 3–5, both the front and rear swing arms 33, 38 extend slightly rearwardly of a transverse line passing through the corresponding pivot axis 32, 37.

As a result of this swing arm orientation, the forward movement of the console subframe 25 passes through a portion of an arc that is substantially balanced fore-and-aft of the aforesaid transverse line passing through the corresponding pivot axis 32, 37. The net result is that the movement of the console subframe 25 forwardly of the median position is substantially fore-and-aft with very little transverse movement. On the other hand, the rearward movement of the subframe 25 from the median position passes along an arc segment lying entirely on the rearward side of the aforesaid transverse line passing through the corresponding pivot axes 32, 37.

One skilled in the art will readily realize that the rearward movement of the subframe 25 from the median position will involve a transverse component of motion about the axis 32, 37. Since the front and rear swing arms 33, 38 extend in opposing directions, the front portion of the console subframe 25 will move to the right away from the operator's seat 15, while the rear portion of the console subframe 25 will move to the left toward the operator's seat 15 as the subframe moves rearwardly. This resultant cocking of the orientation of the console subframe 25 as it moves rearwardly allows the console 20 to rotate about 15° clockwise to mimic the rotational movement of the operator's seat to the implement operating position.

The power for actuating the shifting movement of the console 20 is provided by an electrical actuator 40 having a base end fixed to the chassis 10 and a telescopic end detachably connected to a tab 42 fixed to the front swing arm 33. The electrical control for the actuator 40 is mounted on the top panel 20a of the console 20 in the form of a toggle switch 45 for convenient access by the operator. Accordingly, when the operator desires a forward movement of the console 20, the toggle switch 45 is pushed in one direction to supply current to the actuator 40 to effect an extension thereof. The opposite manipulation of the toggle switch 45 reverses the current flow to the actuator 40 and causes a retraction of the actuator 40 and a rearward movement of the console 20.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a tractor having a mobile chassis; steering controls supported by said chassis for controlling the direction of movement of said mobile chassis over the ground; a seat supported adjacent said steering controls for fore-and-aft movement relative thereto; a control console supporting a plurality of operational control devices adjacent said seat, the improvement comprising:
mounting linkage interconnecting said control console and said chassis to support said control console for movement relative to said seat, said mounting linkage including forward and rearward, longitudinally spaced pivot assemblies, defining forward and rearward pivot axes, respectfully, about which said control console is pivotally movable, each of said pivot assemblies including a swing arm rotatable from one end thereof about the respective said pivot axis and carrying said control console at an opposing end thereof.

2. The tractor of claim 1 wherein said control console is movable forwardly and rearwardly from a median position, the movement thereof forwardly of said median position is generally in a longitudinal direction with minimal transverse movement, the movement of said control console rearwardly of said median position resulting in a transverse rotation of said control console to correspond to the predetermined angular rotation of said seat when moving from said tractor operating position to said implement operating position.

3. The tractor of claim 1 wherein said forward and rearward swing arms extend from their respective said pivot axes in opposite directions to effect a transverse rotation of said control console when moving rearwardly from said median position.

4. The tractor of claim 3 wherein said swing arms are oriented, when said control console is in said median position, at a predetermined angular displacement rearwardly from a transverse orientation, the extent of forward movement of said control console from said median position being limited to approximately twice said predetermined angular displacement so that the overall forward movement of said control console from said median position does not result in any substantial transverse movement of said control console.

5. The tractor of claim 4 wherein the movement of said control console rearwardly of said median position involves a pivotal movement of said swing arms toward a longitudinal line passing through the corresponding said pivot axis, resulting in a transverse displacement of said control console, the orientation of said swing arms in opposing directions resulting in a transverse rotation of said control console.

6. The tractor of claim 5 wherein said swing arms are oriented such that the extent of movement thereof rearwardly of said median position results in a transverse rotation substantially equivalent to the angular rotation of said seat when moved from said tractor operating position to said implement operating position.

7. The tractor of claim 6 wherein said forward and rearward pivot axes are transversely spaced.

8. A tractor comprising:
a mobile chassis;
steering controls supported by said chassis for controlling the direction of movement of said mobile chassis over the ground;
a seat supported adjacent said steering controls for fore-and-aft movement relative thereto, said seat also being rotational from a tractor operating position oriented in a forward direction to an implement operating position rotated through a predetermined angular rotation from said tractor operating position to facilitate the observation of the operation of an implement towed behind said tractor while said tractor is moving in a forward direction;
a control console supporting a plurality of operational control devices adjacent said seat, said console being independently movable in a fore-and-aft direction relative to said seat; and
a mounting linkage supporting said control console from said chassis and having forward and rearward, longitudinally spaced pivot assemblies, defining forward and rearward pivot axes, respectfully, about which said control console is pivotally movable, each of said pivot assemblies including a swing arm rotatable from one end thereof about the respective said pivot axis and carrying said control console at an opposing end thereof, said swing arms extending from their respective said pivot axes in opposite transverse directions.

9. The tractor of claim 8 wherein said control console is movable forwardly and rearwardly from a median position, the movement thereof forwardly of said median position is generally in a longitudinal direction with minimal transverse movement, the movement of said control console rearwardly of said median position results in a transverse rotation of said control console to correspond to the predetermined angular rotation of said seat when moving from said tractor operating position to said implement operating position.

10. The tractor of claim 9 wherein said swing arms are oriented, when said control console is in said median position, at a predetermined angular displacement rearwardly from a transverse orientation, the extent of forward movement of said control console from said median position being limited to a forward angular displacement of said swing arms approximately equal to twice said predetermined angular displacement so that the overall forward movement of said control console from said median position does not result in any substantial transverse movement of said control console, the movement of said control console rearwardly of said median position involving a pivotal movement of said swing arms toward a longitudinal line passing through the corresponding said pivot axis, resulting in a transverse displacement of said control console, the orientation of said swing arms in opposing directions resulting in a transverse rotation of said control console through an angular rotation substantially corresponding to the angular rotation of said seat when moving from said tractor operating position to said implement operating position.

11. The tractor of claim 10 further comprising a linear actuator coupled between said chassis and one of said swing arms to effect pivotal movement of said swing arms.

12. The tractor of claim 11 wherein said linear actuator is electrically controlled from a switch mounted on said control console.

* * * * *